US006711621B1

(12) United States Patent
Mitra et al.

(10) Patent No.: US 6,711,621 B1
(45) Date of Patent: Mar. 23, 2004

(54) SYSTEM AND METHOD OF IMPLEMENTING NETWARE CORE PROTOCOL WITHIN A SOCKETS MODEL (75) Inventors: Shital Mitra, Granite Bay, CA (US); Anthony L. Chen, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 09/687,329

(22) Filed: Oct. 13, 2000

(51) Int. Cl.[7] .............................................. G06F 15/16
(52) U.S. Cl. ....................... 709/230; 709/224; 709/228; 707/101; 707/202; 455/431.1; 370/401; 370/473
(58) Field of Search ................................ 709/230, 224, 709/228; 707/101, 202; 455/432.1; 370/401, 473

(56) References Cited

U.S. PATENT DOCUMENTS 6,229,809 B1 * 5/2001 Murphy et al. ............. 370/401

OTHER PUBLICATIONS

Gerald Foster, "Desktop Management With Novell ZENworks", Apr. 2000, 1 st Edition, Chapter 3, 37 pages.*
Kirk Kimball et al., "Netware Over TCP/IP: Integrating Netware Services into the TCP/IP Environment", Mar. 1997, Novell Research, pp. 44–59.*
Ben Hendrick, "Overview of Netware Client 32 for Windows 95", Nov. 1996, Novell Research, pp. 3–27.*

* cited by examiner

*Primary Examiner*—Jack B. Harvey
*Assistant Examiner*—Hai V. Nguyen (57) ABSTRACT

A system and method of implementing a NetWare Core Protocol (NCP) module within a sockets model, such as a Berkeley Systems Distribution (BSD) Sockets model, is disclosed wherein the NCP module has a NCP reliability sub-module and a NCP library sub-module. The BSD Sockets model has a sockets interface, one or more applications, an Internetwork Packet eXchange (IPX) network layer and a front plane. The system and method of the present invention is implemented such that the NCP library sub-module is located above the sockets interface and the NCP reliability sub-module is located below the sockets interface. This results in many advantages compared to prior implementations which had the entire NCP module located above the sockets layer, including increased performance due to the elimination of task switched data transfer and other interprocess communication steps, such as pipes and selects that impede performance.

7 Claims, 6 Drawing Sheets

SYSTEM AND METHOD OF IMPLEMENTING NETWARE CORE PROTOCOL WITHIN A SOCKETS MODEL

The present invention generally relates to computer networking software and more particularly to a system and method for implementing NetWare Core Protocol (NCP) within a sockets model, such as a Berkeley System Distribution (BSD) sockets model.

In the networking art, an operating system known as Berkeley System Distribution (BSD) has been known for almost two decades, and versions of the system have been commercialized under the UNIX name by several companies over the years. More current operating systems include a BSD sockets implementation model by VxWorks which has network and transport layer protocol stacks that are modeled after BSD TCP/IP protocol stack implementation. VxWorks is marketed by WindRiver Systems of Alameda, Calif.

Novell, Inc. of Provo, Utah has developed a NetWare Core Protocol (NCP) sub-system that is adapted to operate with the VxWorks operating system. The NCP protocol is a reliable connection-oriented protocol used by NetWare servers and clients to provide a variety of services. A NCP protocol module, which typically includes a NCP reliability sub-module and a NCP library sub-module, has been used in BSD sockets implementations in the past, but such implementations have placed the entire NCP module above the sockets layer, in an architectural structure that has, from top to bottom, an applications layer, the sockets layer and a network Internetwork Packet eXchange (IPX) layer.

Such placement of the entire module above the sockets layer had the effect of degrading performance. A task switch was required for transferring data from the application task to the NCP reliability task. Another task switch transferred data from the NCP reliability task to the netTask that resided below the sockets layer. This second task switch added interprocess communication steps, such as pipes and selects, that impeded performance. The NCP protocol module was also previously implemented as an Application Programmers Interface (API) library that consisted of process calls. Application tasks gave up process control to the NCP task and could not listen for changing external events on multiple file descriptors. This meant the application could not be ported to any environment that required a non-blocking application.

Accordingly, it is a primary object of the present invention to provide an improved system and method of implementing NetWare Core Protocol (NCP) within a sockets model that does not have the above described disadvantages.

A related object is to provide such an improved system and method which enables applications to be portable to an environment that did not require blocking calls, i.e., applications using the present invention can be written in a non-blocking mode.

Another related object is to provide such an improved system and method of implementing NetWare Core Protocol (NCP) within the sockets model which provides optimum performance.

Yet another object is to provide such an improved system and method which eliminates a task switch and the use of pipes and selects above the sockets layer.

Still another object is to provide such an improved system and method which enables the NCP module to be IPX transport independent because the system inherits the transport independence characteristics of the sockets interface. This allows applications using the present invention to be transport-independent.

These and other objects will become apparent upon reading the following detailed description of the present invention, while referring to the attached drawings, in which:

DETAILED DESCRIPTION

Broadly stated, the present invention comprises a system and method of implementing a NetWare Core Protocol (NCP) module within a sockets model, wherein the NCP module has a NCP reliability sub-module and a NCP library sub-module. The BSD Sockets model has a sockets interface, one or more applications, an Internetwork Packet exchange (IPX) network layer and a front plane. The system and method of the present invention is implemented such that the NCP library sub-module is located above the sockets interface and the NCP reliability sub-module is located below the sockets interface. This results in many advantages compared to prior implementations which had the entire NCP module located above the sockets layer, including increased performance due to the elimination of task switched data transfer and other interprocess communication steps, such as pipes and selects that impede performance.

Other advantages include portability of applications, because of the ability to allow an application to make non-blocking sockets calls and thereby be portable to environments that utilize non-blocking sockets calls. This is in contrast to previous implementations of NCP as an Application Programmers Interface (API) library which consisted of blocking calls (i.e., calls which result in a delay or idle state while waiting for something to happen). In such an implementation, application tasks gave up process control to the NCP task and could not listen for changing external events on multiple file descriptors. This meant the application could not be ported to any environment that required a non-blocking application. Stated in other words, the present invention allows applications using NCP to be written in non-blocking mode.

Another advantage of the present invention is that it solves a problem of prior implementations of the NCP being IPX transport-dependent, because in the present invention, the transport independences of the sockets interface are inherited due to the location of the sub-modules.

Figure 1:
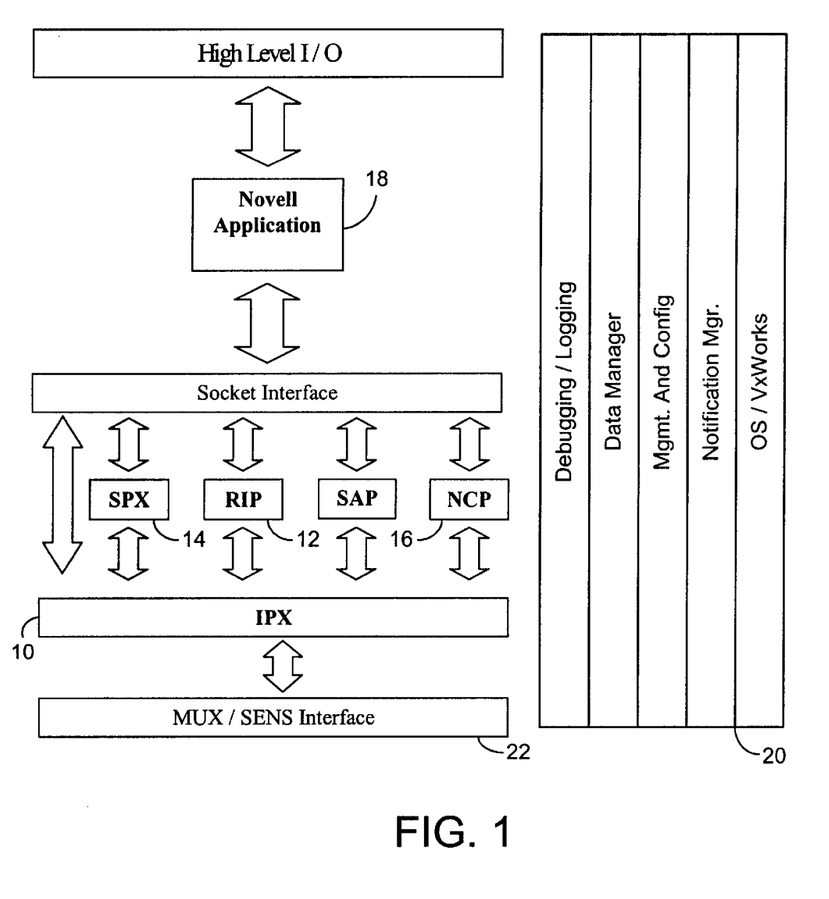
FIG. 1 is a high level block diagram of NetWare components including an NCP module and their relationship to other sub-systems that may be provided in an entire system.

Turning now to the drawings, and particularly FIG. 1, which is a high level block diagram of the NetWare components and their relationship to other components in a system environment. The NetWare protocol stack consists of four main components. At the network layer, IPX (Internetwork Packet Exchange) 10 provides a connectionless, datagram delivery service. The NetWare RIP (Router Information Protocol) module 12 enables route discovery for remote networks. At the transport layer, SPX (Sequenced Packet Exchange) 14 is a connection-oriented protocol that provides reliable delivery of packets as well as error correction and flow control. NCP (NetWare Core Protocol) 16 is a reliable connection-oriented protocol used by NetWare servers and clients to provide a variety of services. A typical NetWare application 18 can be implemented above the sockets layer. The operating system is VxWorks, indicated generally at 20. In the BSD model, information common to all interfaces is kept in an ifnet structure. There is one ifnet structure per hardware interface 22 (Ethernet, token ring port). An interface may support multiple protocols and multiple addresses within a protocol. Information regarding protocol addresses is maintained in an ifaddr structure. Each ifnet structure has a linked list of ifaddr structures.

A protocol family such as IPX/SPX is grouped into a domain (a group of related communication protocols). A protocol family is also referred to as an Address family; e.g., AF_IPX for NetWare IPX/SPX protocol family. Each domain structure contains a pointer to a protocol switch table (protosw) structure. The protosw structure contains hooks to input, output, control, and other processing routines for each protocol supported by the domain.

Figure 2:
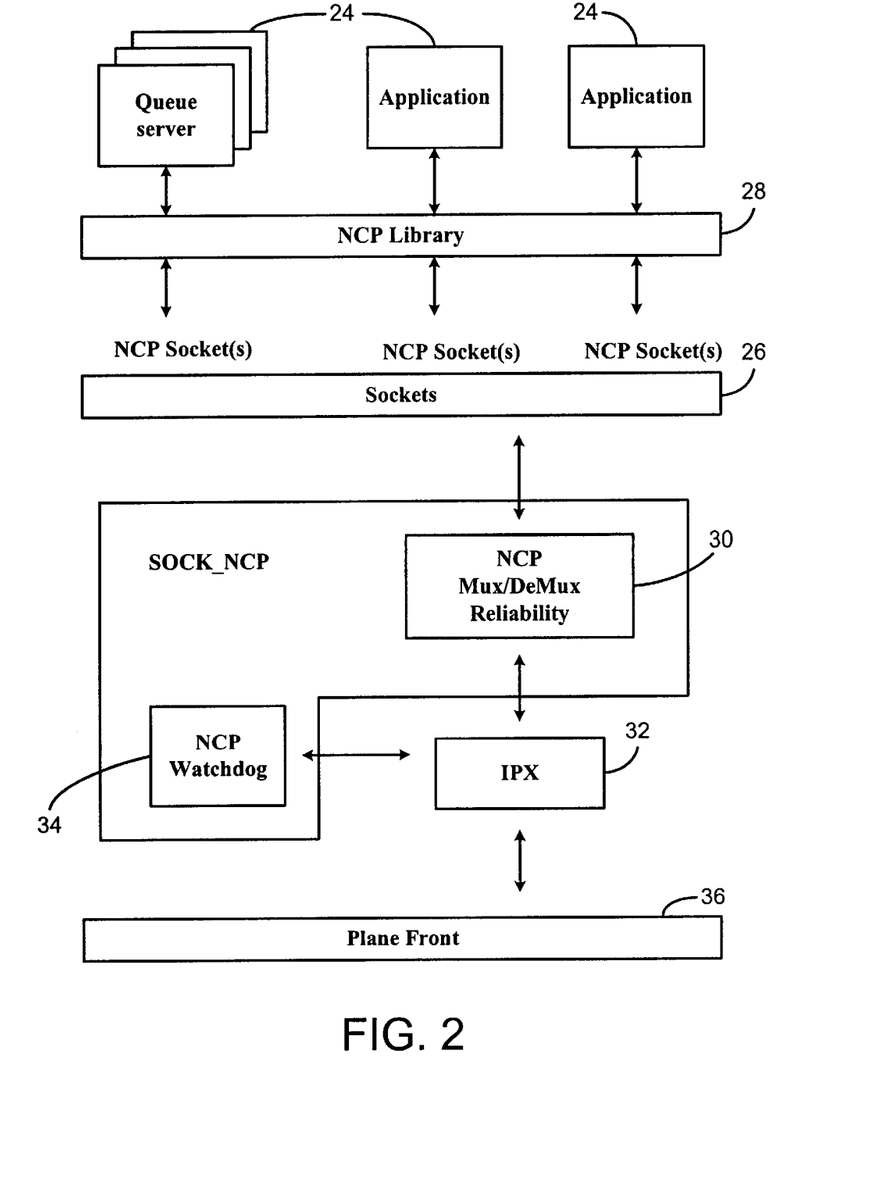
FIG. 2 is a block diagram illustration the NCP module shown with some illustrative applications above the sockets layer.

With regard to the NetWare NCP protocol, the NCP module embodying the present invention is shown in FIG. 2 and provides the functionality needed to support the NetWare Core Protocol. Encapsulated within the IPX protocol, NCP is a connection oriented protocol used for all communications between a print server, such as a JetDirect product manufactured by Hewlett-Packard Company, for example, operating in a bindery mode and NDS print server and NetWare Servers. The applications 24, such as Queue Server is shown as an example, and is not described herein. The applications 24 use the socket API to create sockets in the sockets layer 26 and send and receive data.

The NCP module has three components. The first is a MUX sub-module 28 that is responsible for creating and maintaining the association between sockets and NCP connections and for delivering NCP replies. The second is the NCP Reliability sub-module 30 that is responsible for ensuring reliable and correct NCP communication. The Reliability sub-module maintains the connection and sequence information contained in the NCP header, sends and receives NCP packets, negotiates checksums with the IPX stack 32 and does any encryption processing. The third component is a Watchdog component 34, whose function is to listen for and reply to Watchdog requests. Watchdog packets are IPX packets sent from the NetWare server to a client that has had an inactive connection to a server for a configurable amount of time. The purpose of the watchdog packet is to verify that the client is still active on the given connection. The MUX, Reliability and Watchdog components together are also referred to herein as "SOCK_NCP." The IPX communicates with the front plane 36.

As part of the environment in which the present invention functions, Initialization of the NetWare protocol family within VxWorks comprises several steps: creation and initialization of a domain structure and a protocol switch table, attachment of the protocol to the hardware interface and registration of the protocol with the VxWorks SENS layer. As part of the initialization process VxWorks executes usrNetProtoInit( ), netLibInit( ) and nwAttach( ) routines. Calls to four NetWare routines: ncpLibInit( ), spxLibInit( ), ipxLibInit( ) and rawIpxLibInit( ) are added to the usrNetProtoInit( ) routine. These routines will create entries in the NetWare protocol switch table to handle data for the respective protocols. The function netLibInit( ) will call the function addDomain(&nwdomain) for the NetWare domain. It also spawns netTask; the VxWorks network support task. The function nwAttach( ) will attach the NetWare protocol stack to the SENS layer it will call muxBind( ). Initialization of the NCP Mux/Reliability module (SOCK_NCP) is invoked by direct procedure call. The IPX protocol stack 32 is responsible for invoking the SOCK_NCP initialization procedure. The initialization procedure sets the default value of the SO_RETRANSMIT socket option.

With regard to the socket layer 26, it allows selective applications to access the network services offered by the operating system kernel. A standard BSD 4.3 compatible socket layer is included in VxWorks. Using a standard socket layer means that existing applications can be more easily ported to other systems. The layered organization defines two interfaces: the interface between the user applications and the VxWorks kernel, which we refer to as the "socket API," and the interface between the socket layer and the network protocols. It should be noted that the socket API is not tied to a specific transport or network protocol. Thus, applications such as telnet and tftp, which use the internet protocols, may use the same API as NDS and Direct Mode, which use the NetWare protocols.

In accordance with another important aspect of the system, the subset of the VxWorks BSD socket calls that are supported by SOCK_NCP will be described. Unlike IPX and SPX, NCP allows multiple application sockets to share a single connection. Each socket may be associated with only one NCP connection, however. Consequently, socket calls for NCP protocol may have different semantics than for IPX or SPX. The following socket functions are supported by SOCK_NCP: socket( ); connect( ); read( ); write( ); close( ); setsockopt( ); zbufSockRecv( ); and ioctl( ).

In order to support the requirement that NCP connections may be shared among multiple tasks, each having its own socket file descriptor, SOCK_NCP must maintain a mapping or association between user file descriptors and NCP connections. The functionality of SOCK_NCP includes the following:

1. Registration of a user's file descriptor with SOCK_NCP. SOCK_NCP is not responsible for creating file descriptors, but it must track all NCP sockets in use at any time.

2. Remove a user's file descriptor from the SOCK_NCP mapping mechanism.

3. Create NCP connections, including transmitting connection request packets and processing replies.

4. Destroy NCP connections.

5. Establishnment of an association between a socket and an NCP connection.

6. Removal of an association between a socket and an NCP connection. Note that this does not require the removal of the socket from the system; the socket may subsequently be used with a different NCP connection.

7. Transmission of user requests and delivery of replies. Obviously, a file descriptor must be associated with an NCP connection before a request can be sent.

The user interface to SOCK_NCP is through the standard VxWorks BSD socket layer function calls. The table 1 below associates each socket call with a MUX function.

TABLE 1

| Name | Function |
| --- | --- |
| socket( ) | create an NCP socket and register it with SOCK_NCP |
| close( ) | delete an NCP socket |
| connect( ) | create/remove an NCP service connection |
| read( ) | receive a reply to an NCP request |
| write( ) | send an NCP request |
| setsockopt( ) | specify a retransmission, encryption or checksum option |
| ioctl( ) | remove an association between a socket FD and an NCP connection |

Figure 3:
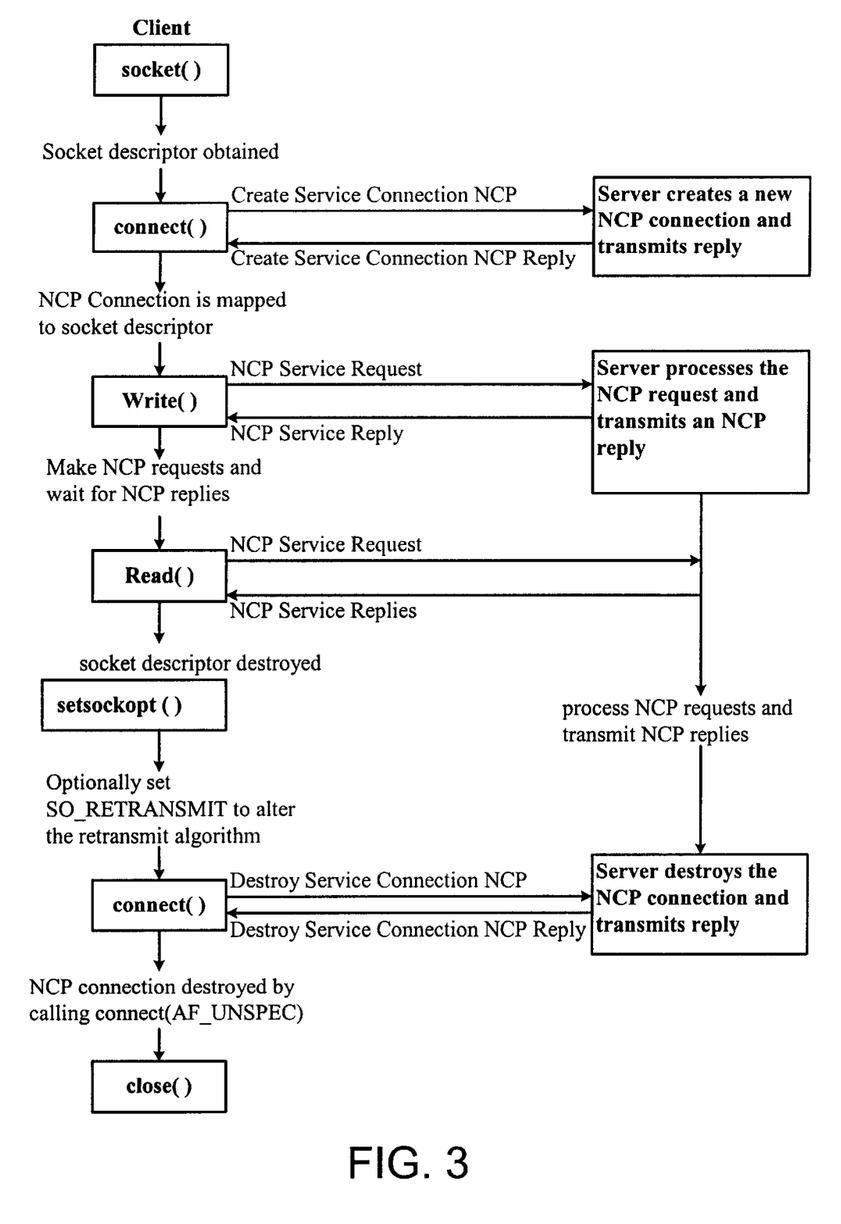
FIG. 3 is a flow chart illustrating the sequence of socket calls that an application must use to establish a connection, send and receive data and tear down the connection.

FIG. 3 illustrates the sequence of socket calls that an application must use to established a connection, send and receive data and tear down the connection. The routines that are used to do so are individually described below.

socket( ) An NCP socket is created by invoking the socket( ) routine. The socket( ) routine must be called before using any functions to perform network I/O. The arguments to socket( ) are the domain, the protocol type and the protocol. To create an NCP socket, the values of these arguments must be AF_IPX, SOCK_SEQPACKET and NWPROTO_NCP. socket( ) returns OK if successful, ERROR otherwise. In the unusual event that an internal data structure is corrupted, socket( ) may fail, and the global variable errno is set to EINVAL.

connect( ) is used to establish an NCP connection to a server. The arguments to connect( ) include: the socket to be used for the connection, a pointer to a sockaddr_nw structure that contains the server's address and an integer containing the number of bytes in the address. New socket( ) may be associated with an existing connection by using ioctl( ). Connections may be torn down by assigning the value AF_UNSPEC in the address family field of the sockaddr argument. connect( ) is used for destroying a connection rather than close( ) because close( ) destroys the socket descriptor which may be reusable. The connect( ) routine returns OK if successful, ERROR otherwise. In the case of an error, the global variable errno is set accordingly:

EINVAL if the length of name is incorrect or if the socket is not connected and the caller has specified AF_UNSPEC as the address family of name EAFNOSUPPORT if the address family of name is not AF_IPX EADDRNOTAVAIL if the port field of name is zero Note that name is cast as a pointer to struct sockaddr, but it actually points to a struct sockaddr_nw.

read( ) is used to read data from a socket. The arguments to read( ) include: the socket descriptor, a pointer to a buffer and the number of bytes to read read( ) returns the number of bytes read, 0 if end of file or ERROR if there was an error.

write( ) is used to write data from a socket. The arguments to write( ) include: the socket descriptor, a pointer to a buffer and the number of bytes to write. write( ) returns the number of bytes written, or ERROR if there was an error. In the event of an error, the global errno is set to EINVAL if the socket is not associated with an NCP connection or if the state of the connection is NCP_BAD.Error! Reference source not found.

close( ) is used to destroy an unconnected socket. An attempt to close a connected socket results in an error. The arguments to close( ) include the file descriptor for the socket. close( ) returns 0 if successful, or ERROR otherwise. If the return value is ERROR, the global errno is set accordingly (e.g. EISCONN if the caller attempts to close a connected socket).

setsockopt( ) may be used to specify the retransmission algorithm or to toggle IPX checksumming or NCP encryption for an NCP socket. The arguments to setsockopt( ) are: the socket descriptor, the level—SOCK_NCP, the name of the option to set (SO_RETRANSMIT, SO_CHECKSUM or SO_ENCRYPTION), a pointer to an integer that contains the new value of the option, the number of bytes in the optval variable. If the requested number of retransmission attempts is invalid, or if the name of the option is not SO_RETRANSMIT, SO_CHECKSUM or SO_ENCRYPTION, errno is set to EINVAL.

ioctl( ) may be used to associate or disassociate a socket with an existing NCP connection. As previously discussed, connect( ) should be used to associate a socket with a new connection. The arguments to ioctl( ) include: the socket descriptor, an integer that specifies a specific request (FIOASSOCIATE or FIODISASSOCIATE), and a pointer to a sockaddr_nw that contains the address of the remote server. ioctl( ) returns 0 if OK, ERROR otherwise. If the return value is ERROR, the global errno is set accordingly (e.g. EINVAL if the socket does not exist or the address does not refer to a valid NCP connection).

ncpLibInit( ) is responsible for creating and initializing a protocol switch table entry for the NCP protocol. The arguments to ncpLibInit( ) include a pointer to an NCP_CFG_PARAMS structure. The return value of ncpLibInit( ) is of type STATUS (OK if successful, ERROR otherwise).

In accordance with an important aspect of the present invention, as shown in FIG. 2, the NCP module is implemented both above and below the BSD layer. The portion below the socket layer, is referred to as "SOCK_NCP." SOCK_NCP consists of the MUX/Reliability and Watchdog components. The socket API, allows applications to access services offered by NCP. These include:

creating a new NCP connection;

(dis)associating a socket with an existing connection;

destroying a socket;

sending requests and receiving replies;

setting socket options that control retransmission of data; and controlling user access to available NCP connections such that there is at most one outstanding request per NCP connection at any time.

The information required to support this functionality is maintained by the MUX/Reliability sub-module 30. The sole responsibility of NCP Watchdog module 34 is to respond to Watchdog requests. A NetWare server may send a Watchdog request if the connection has been idle for some period of time; if the connection is still considered valid (connected sockets still exist), it will reply. Watchdog requests for invalid connections are simply ignored.

Figure 4:
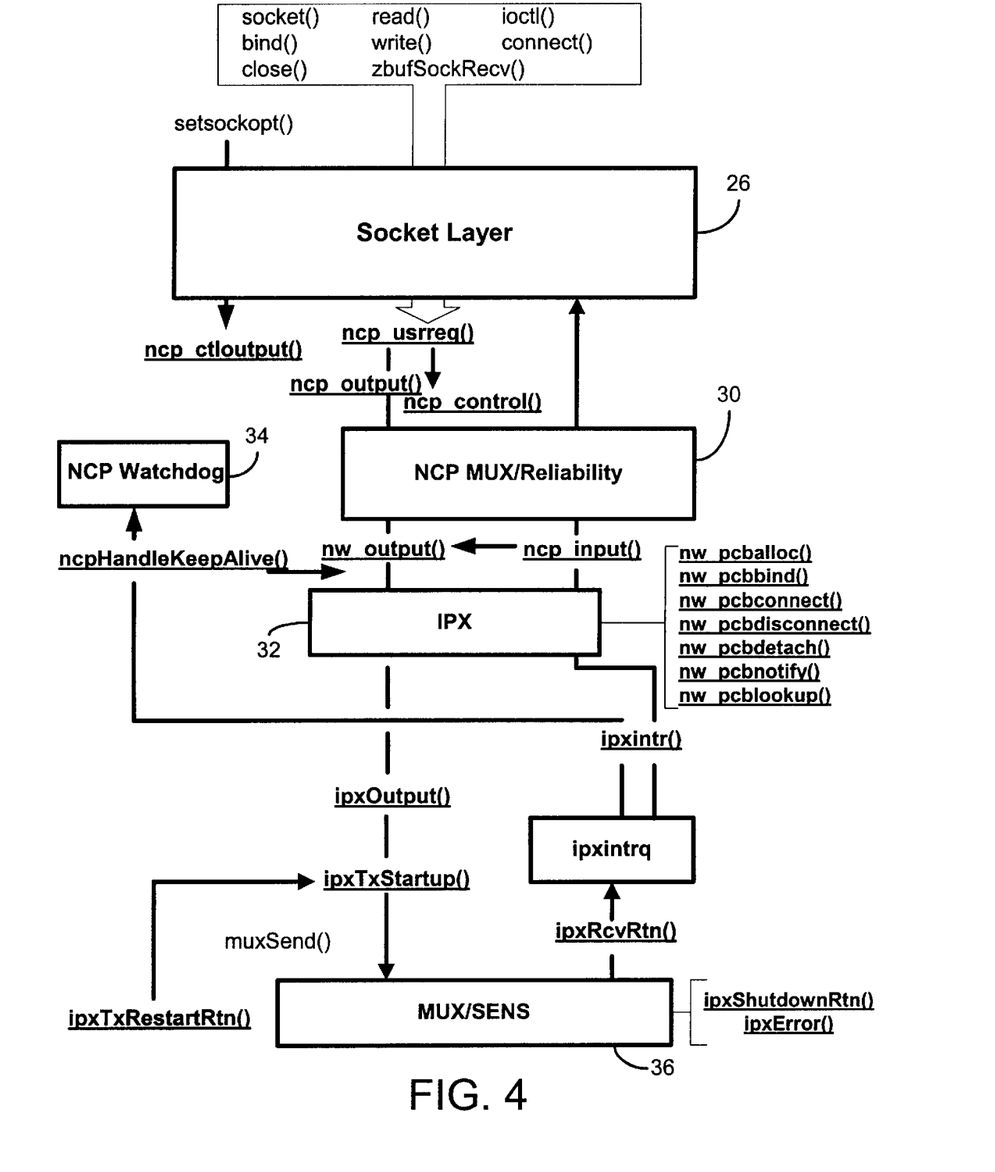
FIG. 4 is a flow chart illustrating the sequence of function calls that handle NCP I/O processing.

FIG. 4 illustrates the sequence of function calls that handle NCP I/O. ncp_usrreq( ) is the entry point in MUX/Reliability for all of the routines in the NCP socket API. The ioctl( ) routine is handled from ncp_usrreq( ) by ncp_controls. The setsockopt( ) routine calls ncp_ctloutput( ) through a pointer in the protocol switch table. Output data is processed in ncp_output( ), which fills in a portion of the NCP header and prepends the IPX header. Because the IPX header is maintained in the ncpcb, the outgoing packet my be given to nw_output( ) directly, bypassing ipx_output( ). nw_output( ) does any necessary route computation before handing the packet to ipxOutput( ).

Incoming NCP packets that are addressed to an IPX port that is in use by an NCP connection are processed by ncp_input( ). This routine is responsible for verifying sequence information, security processing, delivering received data to the application socket and issuing the next pending request. The last step is indicated by the horizontal line between ncp_input( ) and ncp_output( ). All other NCP packets are processed by ncpHandleKeepAlive( ). This function determines whether the packet is a valid watchdog request; if so, a reply is constructed and given to nw_outputs. NCP watchdog requests are addressed to the IPX port number equal to one plus that used by the NCP connection; for example, if the local port is 4100, watchdog requests would be addressed to port 4101. The value of the local IPX port number is the same for all NCP connections (0x4100). This simplifies error checking in ncpHandleKeepAlive( ). NCP packets not destined for a valid port are simply dropped.

In accordance with yet another important aspect of the present invention, the functions of the MUX/Reliability layer include:

1. Creating and terminating NCP connections.
2. Creating, maintaining and deleting associations between application sockets and NCP connections.
3. Delivering NCP replies.
4. Transmission of NCP requests.
5. Retransmission of lost data.
6. Handling ioctls and application requests to get or set socket options.
7. Ensuring that there is only one outstanding request per NCP connection.

Figure 5:
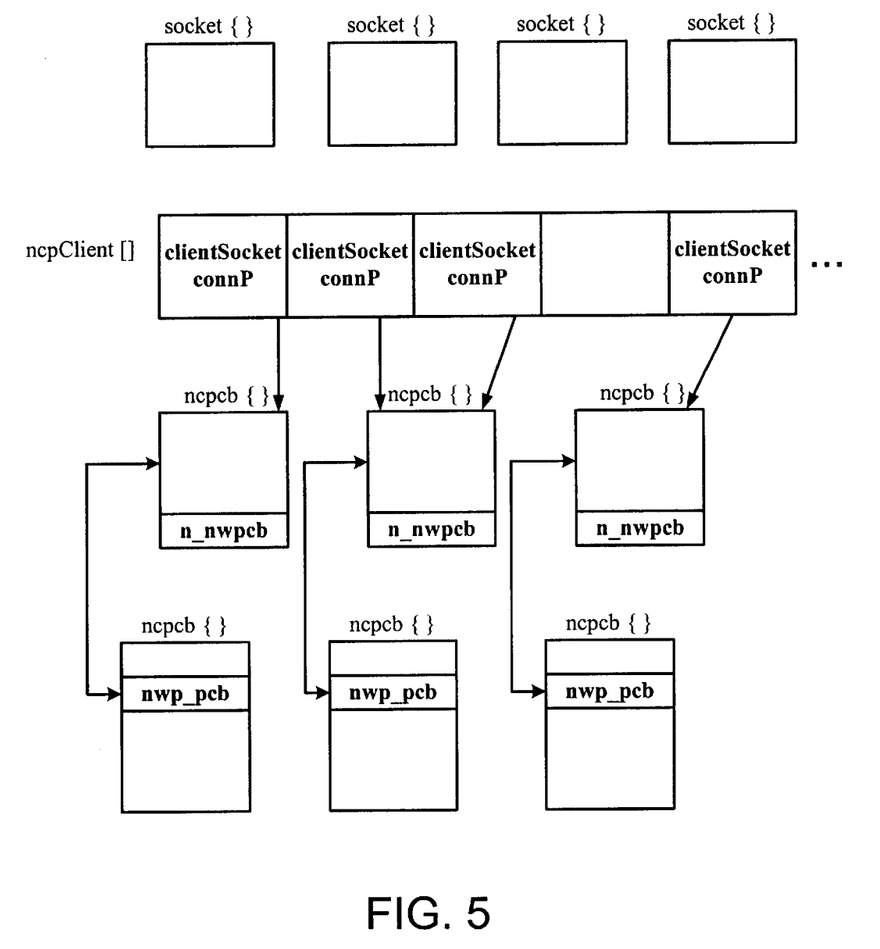
FIG. 5 is a block diagram illustrating the internal data structures used by the NCP MUX/Reliability layer, particularly showing three NCP connections and four application sockets, with one connection being shared by two sockets, and the others being used by a single socket; and, FIG. 6 is a diagram showing the operation of the NCP finite state machine.

FIG. 5 shows the internal data structures used by the NCP MUX/Reliability sub-module 30. There are three NCP connections and four application sockets are shown; one connection is shared by two sockets, and the others are each used by a single socket. An nwpcb/ncpcb pair is maintained for each NCP connection. The pair is created dynamically in response to a connect request from the Connection Manager. All network layer information about the connection, including local and remote IPX addresses and routing data structures, is contained in the nwpcb. The nwpcbs used for NCP connections are maintained on a separate linked list from those associated with IPX and SPX sockets. Each nwpcb contains a pointer to the transport layer data structure, the ncpcb. The ncpcb is defined in Appendix A:. An ncpcb contains all the information necessary to maintain a single NCP connection, including the connection state, the sequence and connection numbers and possibly the current task number. A flags variable is used to control the checksum and encryption options that are in effect for that connection. In order to support the association between an application socket and the NCP connection, an array of ncpClient_t structures is maintained. Each ncpClient_t contains pointers to the socket and the ncpcb. SOCK_NCP can support a maximum of 64 application sockets. Each NCP connection maintains a send queue of pending socket write( ) operations.

Requests are handled on a first come, first served basis and are not prioritized. A socket may issue multiple writes at any time, but each successive write is subject to first come, first served access. Each queue element contains a pointer to an ncpClient_t. Elements are not removed from the queue until after the reply has been delivered, obviating the need to maintain a global pointer to the current requester's socket. The queue is implemented as an array. GET and PUT indices locate the head and tail.

With regard to associating sockets and NCP connections, the effect of the socket( ) call is to assign the clientSocket field (type struct socket *) of an ncpClient_t structure to the newly created socket. A connection is not associated with the socket until a user calls connect( ) (to associate the socket with a new connection) or ioctl(sFD, FIOASSOCIATE) (to associate a socket with an existing NCP connection). Internally, the effect of the ioctl( ) call is to assign the connP field of the appropriate ncpClient_t to the desired ncpcb. Similarly, the effect of ioctl(sFD, FIODISASSOCIATE) is to break that assignment. After the nwpcb and ncpcb have been created, SOCK_NCP builds and transmits a connection request. When the reply is received, soisconnected( ) is called, triggering a return from the connect system call in the application.

With regard to the manner in which NCP requests and replies are processed, after the NCP connection has been established, it may be used to transmit requests from numerous application sockets subject to the requirement that only one request per NCP connection may be outstanding at any time. This forces the MUX/reliability layer to queue requests when the NCP connection is waiting for a reply to a previous request. Each ncpcb structure contains a transmit queue that is implemented as an array of socket pointers (struct socket *) and a pair of indices that locate the head and tail of the queue. When a reply is received, the data is delivered to the requesting socket, and the next request from the queue is sent. SOCK_NCP implements a simple pipelining mechanism whereby an application may issue multiple writes on a single socket before receiving a reply to the first request:

1. An application calls write( ) when that socket is already on the NCP send queue. SOCK_NCP places the request on the socket send buffer;
2. The socket eventually ends up at the front of the queue and the first request is transmitted;
3. A reply is received. SOCK_NCP places the packet on the socket receive buffer, discards the first request from the send buffer and places the ncpClient_t at the back of the NCP send queue;
4. Steps 1–4 may be repeated several times if the application makes more than one write. The number of requests that may be queued is limited by the size of the socket send buffer.

There are options regarding sockets in that an application may use setsockopt( ) to toggle checksumming or encryption or to select one of two retransmission algorithms. The MUX/reliability layer implements ncp_ctloutput( ) to process socket option requests. Supported socket options are listed in the table 2 below. Once a value is set, that value persists until it is set to a new value. The same option settings apply to all sockets that share the NCP connection.

TABLE 2

| Level | Optname | Description | Flag | Datatype | Values |
|---|---|---|---|---|---|
| SOCK_NCP | SO_CHECKSUM | toggles checksumming between on/off | yes | INT | 0 = OFF, default !0 = ON |

TABLE 2-continued

| Level | Optname | Description | Flag | Datatype | Values |
|---|---|---|---|---|---|
| SOCK_NCP | SO_ENCRYPTION | toggles encrypting between on/off | yes | INT | 0 = OFF, default !0 = ON |
| SOCK_NCP | SO_RETRANSMIT | specifies the number of transmit retries | no | UINT | 6 = 6 retries, default n = n retries |

With regard to NCP retransmission, the number of transmit retries is configurable but the delay interval algorithm is constant. The NCP module will retransmit NCP requests based on the value of the SO_RETRANSMIT socket option. The socket option is configurable for each socket descriptor using the setsockopt( ) call. The setsockopt( ) call executes instantaneously and does not queue the socket request. The socket option is listed in table 3 below.

TABLE 3

| Level | Optname | Description | Flag | Datatype | Value |
|---|---|---|---|---|---|
| SOCK_NCP | SO_RETRANSMIT | specifies the number of transmit retries | no | UINT | specifies the number of retries. 6 = 6 retries, default |

The value of the socket option is the number of retries. The default value of the SO_RETRANSMIT socket option is six but may be a greater or smaller number. If the socket option is set to six, SOCK_NCP will retransmit a packet a maximum of six times. The delay interval algorithm is 500 ms, 1 s, 2 s, 4 s, and 8 s . . . 8 s is the maximum delay between packet re-transmits. After the 4$^{th}$ retry, a packet will be retransmitted every 8 seconds. For example, a SO_RETRANSMIT value of 8 will direct SOCK_NCP to re-transmit a packet 8 times at the following intervals: 500 ms, 1 s, 2 s, 4 s, 8 s, 8 s, 8 s and 8 s.

If the reply packet is not received after the last packet is retransmitted, the read( ) call made by the requesting task will return ERROR and the ERRNO value will be set to "ETIMEDOUT". For the default option, "ETIMEDOUT" occurs after ~23.5 seconds. Tasks that may have been using the same connection number on which the "ETIMEDOUT" occurred are not notified of the transmit failure. Subsequent requests will be processed regardless of the state of the connection or the outcome of the last request/reply sequence.

Figure 6:
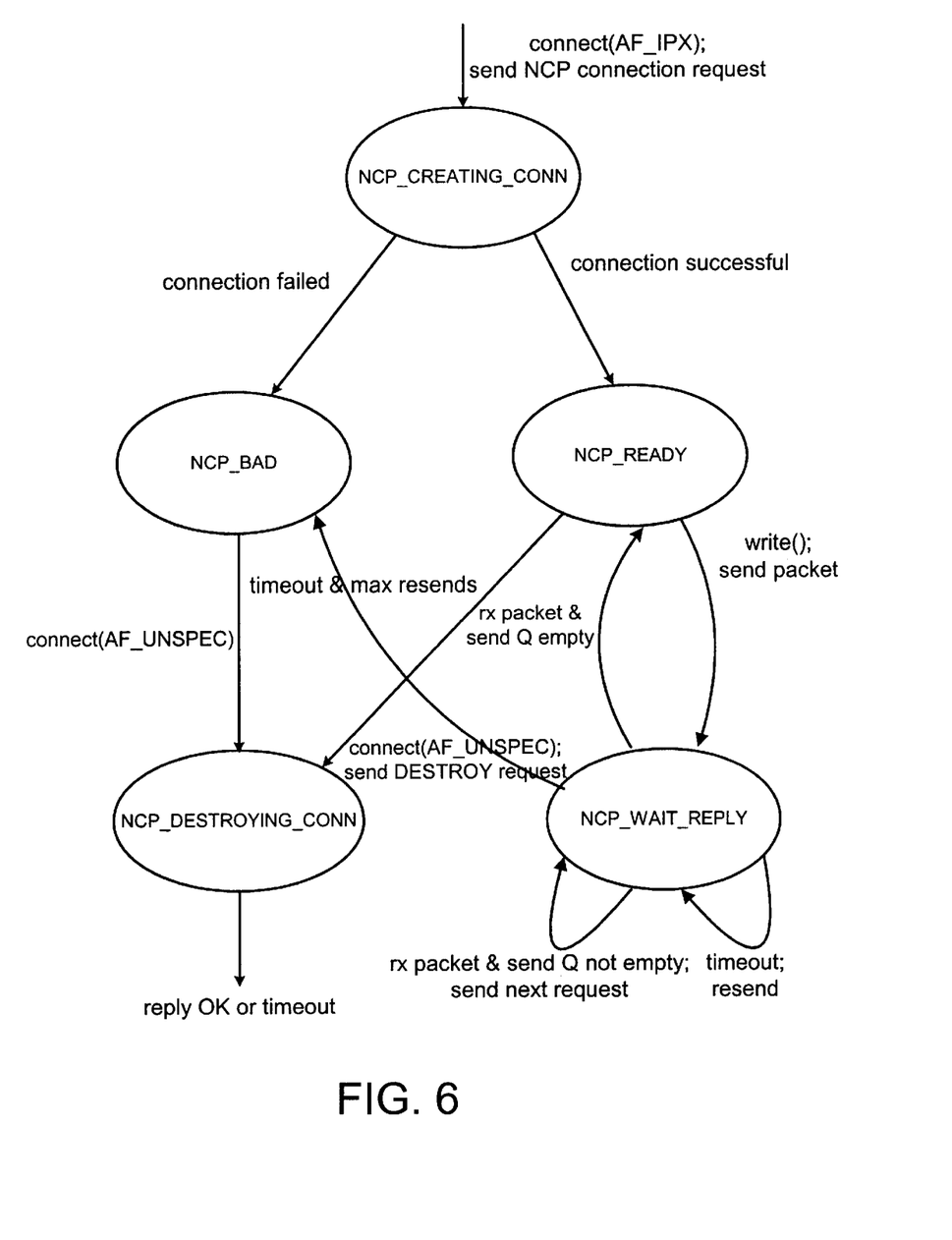

The operation of an NCP connection may be described by a finite state machine comprised of the following states:

NCP_CREATING_CONNECTION: The default initial state when the connection is created NCP_READY: The connection has no outstanding requests and is ready to transmit NCP_WAITING_REPLY: The connection has one outstanding request; new requests are queued NCP_DESTROYING_CONN: The connection is being torn down NCP_BAD: A transmit error occurred FIG. 6 shows the operation of the NCP FSM. In response to connect( ), an NCP connection is created and the connection request issued. When a connection is successful, the NCP_READY state is reached, and user requests may be sent. If the connection attempt is unsuccessful, NCP_BAD is entered and no further activity may occur unless connect (AF_UNSPEC) is made. From NCP_READY, the connection may enter NCP_WAIT_REPLY after a request is sent in response to a write( ) call, or it may transition to NCP_DESTROYING_CONN after sending a destroy request if a user calls connect(AF_UNSPEC). In NCP_WAIT_REPLY, a packet may be received or a timeout may occur. If the send queue is empty and a reply is received, the packet is delivered and the new state becomes NCP_READY; otherwise, the next pending request is sent and the connection remains in NCP_WAIT_REPLY. When a timeout occurs and the maximum number of retransmissions have already been sent, NCP_BAD is entered; otherwise, the request is retransmitted while remaining in NCP_WAIT_REPLY. A write or ioctl(FIOASSOCIATE) operation on a connection in the NCP_BAD state sets the global errno to ENCPBADCONN. It is not an error to call ioctl (FIODISASSOCIATE) or connect(AF_UNSPEC) on an NCP_BAD connection. All pending requests are cancelled on NCP_BAD connections and SOCK_NCP will flush the send and receive buffers of each associated socket.

With regard to checksums and encryption signatures, by default, checksumming and encryption are turned off. Checksumming and encryption are flagged as enabled/disabled through the securityFlags byte of the "Get Big Packet NCP Max Packet Size" NCP service request/reply. The security flag can be set by the client in the NCP service request or accepted from the NetWare server in the NCP service reply. Either way, SOCK_NCP will extract the security information from the "Get Big Packet NCP Max Packet Size" reply and store the information locally on a per connection basis. When the IPX/NCP modules become disabled, the security flags are reset to the default. If the security information specifies that encryption signatures are enabled, SOCK_NCP will calculate and append the encryption key to the NCP request packet and decode the key from NCP service replies. If the security information specifies that checksums are enabled, SOCK_NCP will direct the IPX protocol stack to perform outgoing checksums. For incoming packets, SOCK_NCP will perform the checksums.

With regard to the socket interfacing the NCP module, ncp_ctloutput( ) is the pr_ctloutput( ) routine in SOCK_

NCP's protocol switch table, the ncp_ctloutput( ) routine is used to set and retrieve various protocol-level control options. It is called from the kernel functions sosetopt( ) and sogetopt( ). The arguments to ncp_ctloutput( ) include: the requested control operation, a pointer to the socket on which the request was issued, the level, the name of the option to retrieve or change, and a value field which may be used to return various types of information. The ncp_ctloutput( ) routine returns 0 if successful or EINVAL if the name is not SO_RETRANSMIT, SO_CHECKSUM or SO_ENCRYPTION or the retransmission algorithm (the number of retransmission attempts) is incorrect.

The handling of user requests is done by the ncp_usrreq( ) routine which is NCP's pr_usrreq( ) entry in the protocol switch table. All user requests that originate as socket calls for the SOCK_NCP protocol are handled by ncp_usrreq( ). The arguments to ncp_usrreq( ) include: a pointer to the socket; the request (PRU_ATTACH, PRU_CONNECT etc.); a pointer to an mbuf containing data; a pointer to an mbuf containing an address; and possibly a pointer to an ifnet structure. The ncp_usrreq( ) routine returns 0 if successful, or a system error such as EINVAL or ENOBUFS otherwise. The correspondence between the socket API and the value of the req argument to ncp_usrreq( ) is shown in the table below. Only a subset of the full socket API is supported by the NCP MUX.

The ncp_control( ) routine is used to handle ioctl( ) calls from the application layer. SOCK_NCP currently supports the following ioctl( ) requests: FIODISASSOCIATE is used to break the association between a user socket and an existing NCP connection. This does not destroy the socket. FIOASSOCIATE is used to associate a user socket with an existing NCP connection. The socket must have been created by a call to sockets. The arguments to ncp_control( ) include: a pointer to the socket, the request; a pointer to request-specific data; and possibly a pointer to the interface. The ncp_control( ) routine returns 0 if successful, or a system error otherwise. A request to associate a socket with an invalid address returns EINVAL; if the socket is already connected, ncp_control( ) returns EISCONN. An attempt to associate a socket with a connection that is in the NCP_BAD state returns ENCPBADCONN. ncp_control( ) returns EINVAL if a user attempts to disassociate an unassociated socket. An invalid command causes ncp_control( ) to return EOPNOTSUPP.

The ipxintr( ) routine has the responsibility of determining the type of all incoming IPX packets. If the nwpcb is found (based on sender's address and destination IPX socket number), ipxintr( ) calls ncp_input( ). If the nwpcb is not found, the incoming packet may be an NCP watchdog request, in which case ncpHandleKeepAlive( ) is called. The arguments to ncp_input( ) include a pointer to the incoming packet (mbuf *) and a pointer to the appropriate IPX control block (nwpcb *). The responsibilities of ncp_input( ) include:

1. Verifying correct packet request type, sequence and connection numbers.
2. Security processing, if required.
3. Routing incoming replies to the sender's socket.
4. Sending the next queued request.

NCP requests are transmitted using the ncp_output( ) routine. When there are no outstanding requests, the next pending request may be sent. The responsibilities of ncp_output( ) include: filling in IPX and NCP headers; computing checksums and signatures, as required; appending the packet to the socket's send buffer so that it is available for retransmission, if necessary; copying the packet and handing it off to nw_output( ). The arguments to ncp_output( ) include a pointer to an NCP control block, a pointer to an mbuf containing the NCP header and the payload. It is the responsibility of the user to allocate and partially fill the NCP header. ncp_output( ) returns 0 if successful or a system error otherwise.

ncp slowtimo( ) is called by the kernel every 500 ms, but this time period could be increased or decreased. Its responsibility is to decrement the retransmission timer (if set) and to call ncp_usrreq( ) with a command value of PRU_SLOWTIMO if the timer value is zero. There are no arguments to ncp-slowtimo( ) and the return type is void.

With regard to the NCP Watchdog 34, this component of the NCP module is responsible for accepting and responding to NetWare Watchdog packets and it runs below the sockets layer. As a part of the netTask and kernel of VxWorks, the Watchdog module runs within the netTask's and kernel's thread of execution. Watchdog packet behavior is configurable on the NetWare Server. The default configuration for Watchdog behavior causes the NetWare server to send Watchdog packets to a client that has had an inactive connection for the last 5 minutes. After the first watchdog packet is sent to the client, the server sends a watchdog packet every minute for nine minutes or until a reply is received by the server from the client. If a watchdog reply is not received, the server invalidates the current connection and recycles the connection number.

NetWare defines the number of the port dedicated to listening for watchdog packets as one plus the number of the port that is used for NCP service request responses. For example, if port 4100h is used as the source port for NCP service requests/replies, port 4101h would become the port used to capture Watchdog packets. Upon receiving a watchdog packet this component of netTask will determine if the connection number given in the watchdog packet is still valid. If the given connection number is still valid, a watchdog response packet will be built and sent to the source of the Watchdog packet (a NetWare server) via an IPX procedure call. If the connection number is not valid, no response is transmitted. All incoming NCP packets that are destined for a non-existent IPX port are processed by ncpHandleKeepAlive( ). ncpHandleKeepAlive( ) is responsible for verifying that the destination IPX port number satisfies the criterion above, namely that the watchdog port be equal numerically to one plus the port number of an existing NCP connection. It is not necessary to allocate an nwpcb/ncpcb pair for watchdog ports, since all watchdog processing may be confined to ncpHandleKeepAlive( ).

With regard to the ncpHandleKeepAlive( ), it is called from ipxintr( ) to handle incoming NCP packets that are not destined for an existing IPX port. Since most of these are valid NCP watchdog packets, the normal course of action is to verify whether the NCP connection to which the request refers is still valid, and to reply accordingly. All other packets are simply dropped. The arguments to ncpHandleKeepAlive( ) include a pointer to the mbuf that contains the incoming packet. The return type is void.

The structure of the NCP service request packet is outlined in table 4 below. The shaded areas represent the portions of the packet that are initialized by NCP library functions. The unshaded areas of the packet are supplied by the NCP Mux/Reliability sub-module of netTask below the sockets layer.

TABLE 4

| offset | content | notes | type | |
|---|---|---|---|---|
| 0 | RequestType | 0x1111 = create service connection<br>0x2222 = service request<br>0x5555 = destroy service connection<br>0x7777 = burst mode transfer | word | } Request |
| 2 | SequenceNumber | Mux/Reliability places LastSequence + 1 here | byte | |
| 3 | ConnectionNumber Low | Assigned by server at login | byte | |
| 4 | TaskNumber | Identity of client task | byte | |
| 5 | ConnectionNumber High | Service Connection used by 1000 user NetWare, otherwise 0 | byte | |
| 6 | Payload | Contents of the payload vary with each NCP service request. The payload is initialized with function parameters. | variable | } Request |

The structure of the NCP service reply packet is outlined in the table 5 below. Data within the shaded area is returned to the requesting task across the sockets layer.

TABLE 5

| offset | content | notes | type | |
|---|---|---|---|---|
| 0 | ReplyType | 0x3333 = service reply<br>0x7777 = burst mode transfer<br>0x9999 = request being processed | word | } Reply |
| 2 | SequenceNumber | should match sequence number of request | byte | |
| 3 | ConnectionNumber Low | | byte | |
| 4 | TaskNumber | | byte | |
| 5 | ConnectionNumber High | | byte | |
| 6 | CompletionCode | 0 = success | byte | |
| 7 | ConnectionStatus | connection down if $4^{th}$ bit = 1 | byte | |
| 6 | Payload | Requested data | variable | } Reply Pay |

APPENDIX A

NCP DATA STRUCTURES

```
/* Raw NCP Request Header */
typedef struct {
    USHORT      requestType;
    uchar       sequenceNum;
    uchar       loOrderConnNum;
    uchar       taskNum;
    uchar       hiOrderConnNum;
    uchar       requestCode;
} NCPRequestHeader;
/* Raw NCP Reply Header */
typedef struct {
    USHORT      requestType;
    uchar       sequenceNum;
    uchar       loOrderConnNum;
    uchar       taskNum;
    uchar       hiOrderConnNum;
    uchar       completionCode;
    uchar       connStatusFlags;
} NCPReplyHeader;
/* Keep alive packet */
typedef struct {
    uchar       loOrderConnNum;
    uchar       requestType;
} KeepAlivePacket;
/* Data structure used to associate sockets and NCP connections */
typedef struct ncpclient {
    struct socket *clientSock;
    struct ncpcb  *connP;
} ncpClient_t;
/* The mapping is maintained in an array */
ncpClient_t    ncpClients[NCP_MAX_CLIENTS];
/* The ncpcb contains information regarding the
 * state of the NCP connection, connection and
```

APPENDIX A-continued

NCP DATA STRUCTURES

```
 * sequence numbers, IPX header, flags and assorted
 * other information.
 */
struct ncpcb {
    struct nwpcb      *s_nwpcb;
    u_char            state;
    struct ipx        n_ipx;
    struct ncpreq     n_reqhdr;
    short             n_timer;
    short             n_rxtcur;
    struct ncpclient  *snd_queue[NCP_MAX_CLIENTS];
    u_short           n_get;
    u_short           n_put;
};
/* array of values for NCP retransmit
 * timer backoff
 */
int ncp_backoff[ ] = {1, 2, 4, 8, 16, 16};
add NCP headers to NCP requests;
strip NCP headers forom NCP replies;
send and receive NCP packets and perform error recovery
concerning packets;
maintain NCP connection endpoints;
build encryption signatures; and,
validate checksums with the IPX stack.
```

From the foregoing it should be appreciated that a system and method of implementing a NetWare Core Protocol (NCP) module within a Berkeley Systems Distribution (BSD) Sockets model wherein the NCP module has a NCP reliability sub-module and a NCP library sub-module has been shown and described which has many desirable attributes and advantages. The system and method of the present invention is implemented such that the NCP library sub-module is located above the sockets interface and the NCP reliability sub-module is located below the sockets interface. This results in many advantages including increased performance due to the elimination of task switched data transfer and other interprocess communication steps, such as pipes and selects that impede performance. Other advantages include portability of applications, because of the ability to allow an application to make non-blocking sockets calls and thereby be portable to environments that utilize sockets.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A networking system for implementing NetWare Core Protocol (NCP) within a sockets model operating system in which data is transmitted in packets, said system comprising:

a sockets interface;

at least one application located above said sockets interface;

a NCP module having a NCP reliability sub-module and a NCP library sub-module, said NCP library sub-module being located above said sockets interface, said NCP reliability sub-module being located below said sockets interface;

an Internetwork Packet exchange (IPX) network layer located below said sockets interface; and, a front plane located below said sockets interface.

2. A networking system as defined in claim 1 wherein said NCP library sub-module is adapted to build outgoing NCP packets.

3. A networking system as defined in claim 1 wherein said NCP reliability sub-module is adapted to perform one or more of the following tasks:

add NCP headers to NCP requests;

strip NCP headers forom NCP replies;

send and receive NCP packets and perform error recovery concerning packets;

maintain NCP connection endpoints;

build encryption signatures; and, validate checksums with the IPX stack.

4. A networking system for implementing NetWare Core Protocol (NCP) within a sockets model operating system in a manner which allows an application to make non-blocking sockets calls, said system comprising:

a sockets interface;

at least one application located above said sockets interface;

a NCP module having a NCP reliability sub-module and a NCP library sub-module, said NCP library sub-module being located above said sockets interface, said NCP reliability sub-module being located below said sockets interface;

an Internetwork Packet eXchange (IPX) network layer located below said sockets interface; and, a front plane located below said sockets interface.

5. A method of implementing a NetWare Core Protocol (NCP) module within a sockets model, NCP module being of the type which has a NCP reliability sub-module and a NCP library sub-module the sockets model having a sockets interface, at least one application, an Internetwork Packet eXchange (IPX) network layer and a front plane, said method comprising:

placing the NCP library sub-module above said sockets interface and the NCP reliability sub-module below said sockets interface, thereby allowing an application to make non-blocking sockets calls and thereby be portable to environments that utilize non-blocking sockets calls.

6. A method as defined in claim 5 wherein said NCP library sub-module is adapted to build outgoing NCP packets.

7. A method as defined in claim 5 wherein said NCP reliability sub-module is adapted to perform one or more of the following tasks:

add NCP headers to NCP requests;

strip NCP headers forom NCP replies;

send and receive NCP packets and perform error recovery concerning packets;

maintain NCP connection endpoints;

build encryption signatures; and, validate checksums with the IPX stack.

* * * * *